United States Patent [19]
Heaton, Jr.

[11] Patent Number: 5,339,411
[45] Date of Patent: Aug. 16, 1994

[54] METHOD FOR MANAGING ALLOCATION OF MEMORY SPACE

[75] Inventor: Charles J. Heaton, Jr., Southbury, Conn.

[73] Assignee: Pitney Bowes Inc., Stamford, Conn.

[21] Appl. No.: 142,541

[22] Filed: Oct. 22, 1993

Related U.S. Application Data

[63] Continuation of Ser. No. 631,833, Dec. 21, 1990, abandoned.

[51] Int. Cl.$^5$ .............................................. G06F 12/02
[52] U.S. Cl. ................................ 395/600; 364/DIG. 1; 364/243; 364/244; 364/245; 395/425
[58] Field of Search ... 364/200 MS File, 900 MS File; 395/600, 400, 425

[56] References Cited

U.S. PATENT DOCUMENTS

| | | | |
|---|---|---|---|
| 3,596,257 | 7/1971 | Patel | 395/425 |
| 4,096,568 | 6/1978 | Bennett et al. | 395/400 |
| 4,210,961 | 7/1980 | Whitlow et al. | 395/600 |
| 4,405,983 | 9/1983 | Perez-Mendez | 395/425 |
| 4,435,752 | 3/1984 | Winkelman | 395/600 |
| 4,611,272 | 9/1986 | Lomet | 395/600 |
| 4,758,944 | 7/1988 | Bartley et al. | 395/425 |
| 4,849,878 | 7/1989 | Roy | 395/600 |
| 4,951,194 | 8/1990 | Bradley et al. | 395/425 |
| 4,961,139 | 10/1990 | Hong et al. | 395/600 |
| 4,962,451 | 10/1990 | Case et al. | 395/600 |
| 5,020,020 | 5/1991 | Pomfret et al. | 395/200 |
| 5,109,336 | 4/1992 | Guenther et al. | 395/425 |
| 5,155,849 | 10/1992 | Westfall et al. | 395/600 |
| 5,163,046 | 11/1992 | Hahne et al. | 370/79 |
| 5,212,686 | 5/1993 | Joy et al. | 370/60 |
| 5,226,155 | 7/1993 | Iijima | 395/600 |

Primary Examiner—Joseph L. Dixon
Assistant Examiner—Matthew M. Kim
Attorney, Agent, or Firm—Robert H. Whisker; David E. Pitchenik

[57] ABSTRACT

A method of managing the memory space of a data processing device includes defining a number of memory blocks in the memory space and establishing a different maximum memory fragment size for each of the memory blocks. When a memory allocation request is received, it is attempted to allocate the request in the memory block that has the smallest maximum fragment size that is not exceeded by the size of the allocation request. Consequently, smaller allocation requests tend to be loaded in the blocks with smaller maximum fragment sizes, while larger allocation requests are restricted to blocks with a sufficiently large maximum fragment size. The resulting segregation by size of memory fragments among blocks leads to more efficient use of the memory space. Memory fragments may also be segregated by size within a memory block. This is accomplished by establishing a fragment size dividing point for the memory block and then loading allocation requests that exceed the dividing point from the end of the block and loading smaller requests from the beginning of the block.

3 Claims, 14 Drawing Sheets

METHOD FOR MANAGING ALLOCATION OF MEMORY SPACE

This application is a continuation of application Ser. No. 07/64,833, filed Dec. 23, 1990 now abandoned.

FIELD OF THE INVENTION

This invention relates to a method of managing the memory space of a data processing device. The inventive method disclosed herein is particularly useful with microcomputers that employ the known DOS operating system.

BACKGROUND OF THE INVENTION

Microcomputers, often referred to as PC's, have become ubiquitous. A very large number of the PC's now in use employ the Microsoft-Disk Operating System (hereinafter MS-DOS) operating system (published by Microsoft Corporation, Redmond, Wash.) or one that is virtually identical in operation to MS-DOS. The International Business Machines (hereinafter IBM) Personal Computer Model AT is one example of a PC that employs the MS-DOS operating system. Many application programs are written for MS-DOS PC's and their 'clones', which are sometimes collectively called 'DOS machines'. These programs are written in reliance upon, and within the constraints of, the many standard features of DOS. Among these standard features are a utility for allocating a portion of the computer's memory space in response to a request made by the application program and a second utility for deallocating (or 'freeing') a previously allocated portion, again in response to a request from the application program.

As used herein, the following terms shall be understood as set forth below:

"memory space"—a plurality of sequentially addressed positions, each position corresponding to a basic unit of memory such as a byte or word; "segment"—a sequential portion, less than the whole, of a memory space; "memory block"—a segment which is defined by a fixed first end and second end, i.e. the lowest and highest addresses included in the block; "fragment"—a segment which can be either "allocated", i.e. assigned to an application, or "unallocated", i.e. available for assignment to an application; "size"—the number of addressed positions in a memory space or segment.

A program that is frequently encountered by designers of applications programs is memory fragmentation. FIGS. 1(a) and (b) are a schematic illustration of how memory fragmentation comes about.

It will be understood that a memory space may be viewed as a string of sequentially addressed positions, each position corresponding to a basic unit of memory, such as a byte. It will further be understood that the memory space may be considered to be occupied by a number of memory fragments, i.e. continuous blocks of sequentially addressed memory positions, and that each such fragment either has been allocated for the purpose of holding data (sometimes referred to as "in use") or is unallocated and hence available for allocation (sometimes referred to as "free" or "not in use"). In FIG. 1(a), reference numeral 10 indicates generally a box that may be considered to represent either the entire memory space of a computer, or a segment that is part of a memory space. It is assumed that memory portions, or fragments, 12, 14, 16 have been allocated, filling segment 10. In the DOS environment such an allocation can readily occur as an empty segment is allocated from beginning to end in response to a series of memory allocation requests. It will be noted that fragments 12 and 16 are approximately the same size and that fragment 14 is smaller than, and occupies the space between, fragments 12, 16. Now, if fragments 12, 16 are freed in response to deallocation requests, the status of segment 10 will be as shown in FIG. 1(b). At this point most of segment 10 is available for allocation. However, if the next requested memory allocation requires a fragment 18 that is only slightly larger than each of available fragments 12, 16, the requested fragment cannot be allocated in segment 10, even though the total available space in segment 10 greatly exceeds the size of the requested fragment.

As will be appreciated from the foregoing somewhat simplified example, memory fragmentation results in inefficient use of the memory space and also in what can be considered false indications that the memory space is exhausted. These conditions may become particularly acute for transaction-oriented or other applications in which the requested fragments vary in size over a considerable range and fragments are frequently deallocated. For these applications, a large number of relatively small unused fragments quickly builds up and it soon becomes impossible to fill requests for allocation of relatively large fragments, even though a substantial percentage of the memory space remains unused.

The usual solution to the false exhaustion of memory space is simply to run the application on a PC that has a larger memory capacity. Of course, the larger memory increases the cost of the PC, and the use of the memory remains inefficient.

Another known approach is coalescing, i.e. rearranging the allocated fragments so that unused portions of the memory space are combined. For example, and referring again to FIG. 1(b), this could take the form of moving fragment 14 to the top of segment 10 after fragments 12, 16 were freed, thereby combining fragments 12, 16. However, the software required for coalescing adds considerable complexity and may result in unacceptable overheads in terms of memory and processing time.

SUMMARY OF THE INVENTION

According to the invention, a method of managing the memory space of a data processing device includes the following steps:

(1) defining a memory block that includes some but not all of the memory space;
(2) establishing a maximum fragment size for the memory block;
(3) receiving a memory request that includes a requested fragment size;
(4) if the requested fragment size does not exceed the block's maximum fragment size, allocating a portion of the memory block to the memory request; and
(5) if the requested memory fragment size exceeds the block's maximum fragment size, processing the memory request without allocating a portion of the block.

According to another aspect of the invention, the method may also include the further step of allocating a memory request to the portion of the memory space that is outside of the memory block if the requested fragment size exceeds the memory block's maximum fragment size.

According to another aspect of the invention, a method of managing the memory space of a data processing device includes the following steps:

(a) defining a memory block that has a first end and a second end and includes at least some of the memory space;

(b) establishing a fragment size dividing point for the memory block;

(c) receiving a memory request that includes a requested fragment size; and (d) allocating to the memory request a portion of the memory block, with the allocated portion being as close as possible to the first end of the block if the requested fragment size does not exceed the dividing point and being as close as possible to the second end of the block if the requested fragment size exceeds the dividing point.

BRIEF DESCRIPTION OF THE DRAWINGS

FIGS. 2A, 2B are a flow diagram that illustrates a routine for initializing memory blocks in accordance with the invention.

DETAILED DESCRIPTION OF PREFERRED MODES OF THE INVENTION

Figure 1A:
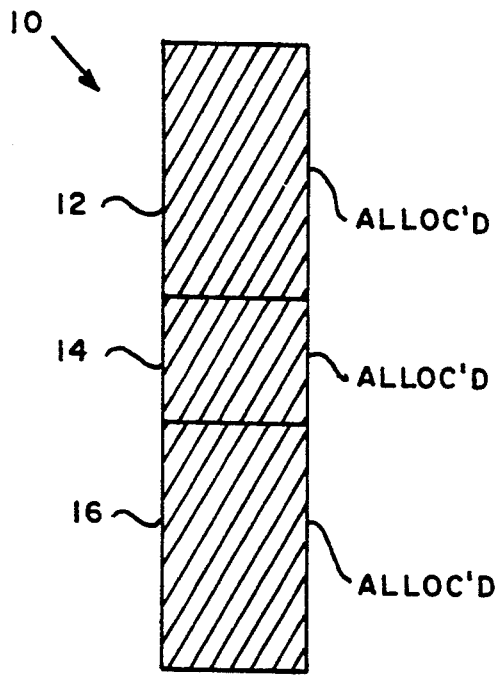
FIGS. 1A, 2A are a schematic illustration of a disadvantageous memory fragmentation encountered in prior art memory management methods.
Figure 1B:
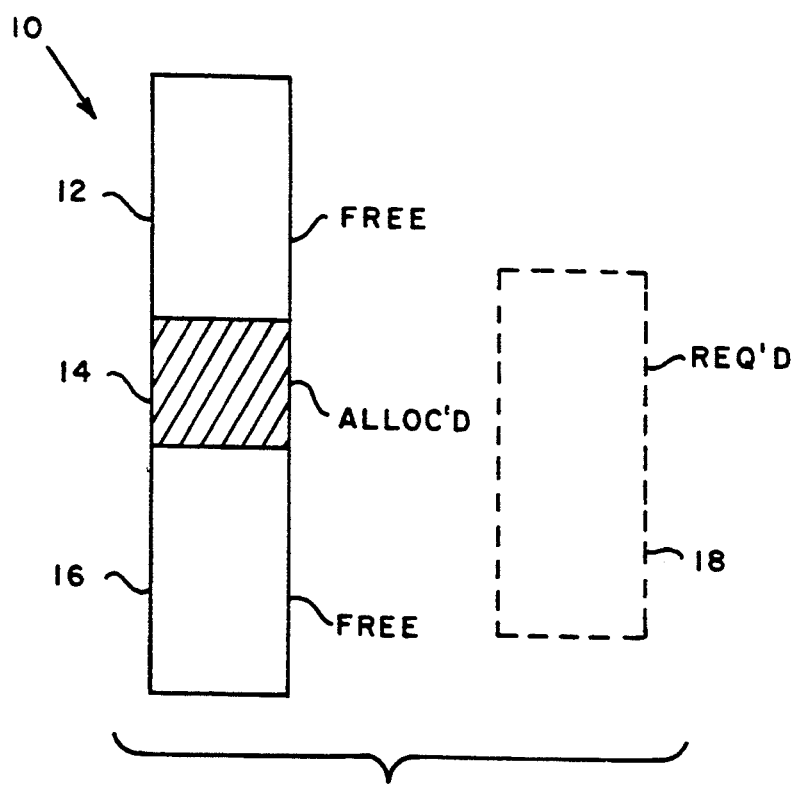
Figure 2A:
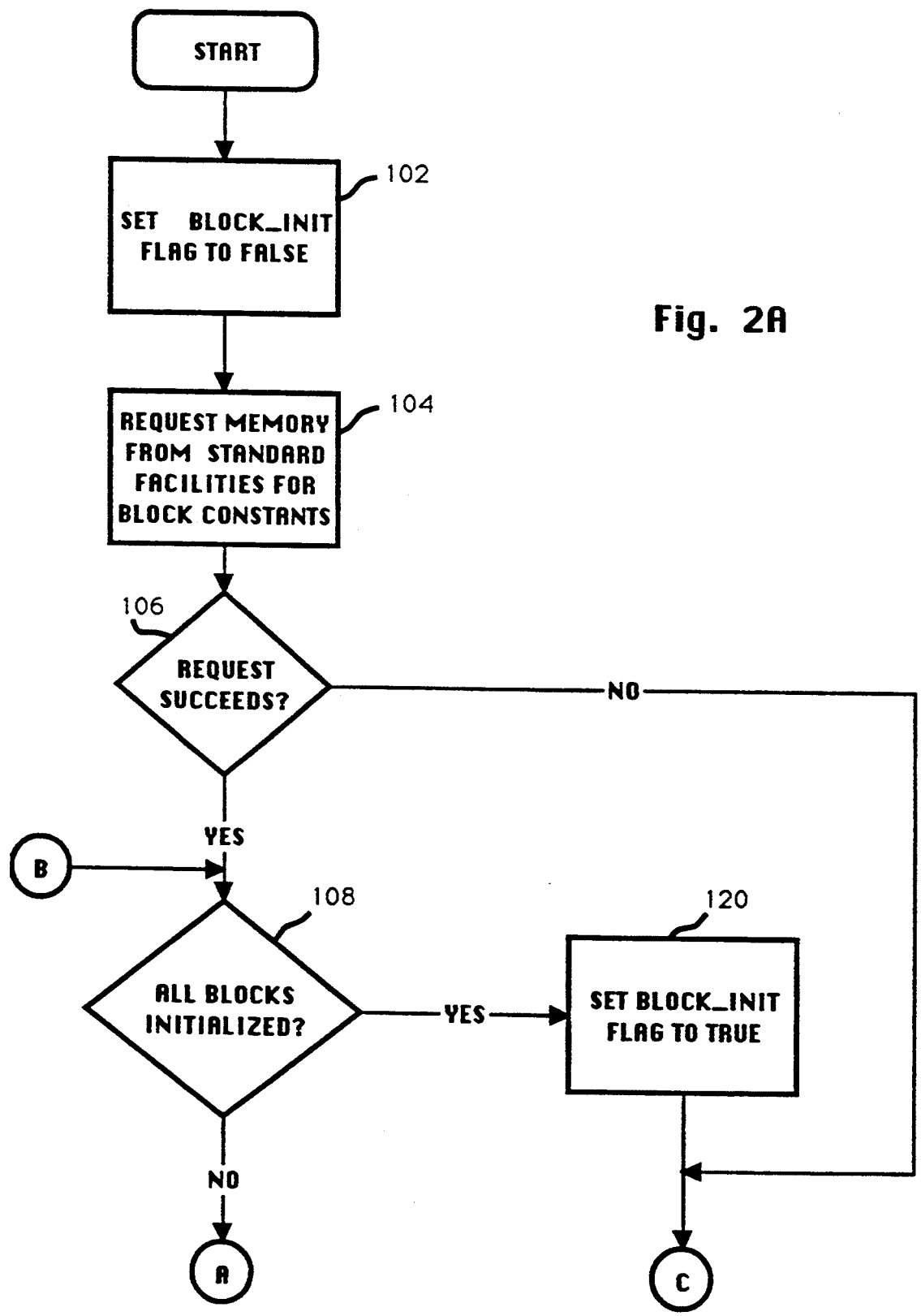
Figure 2B:
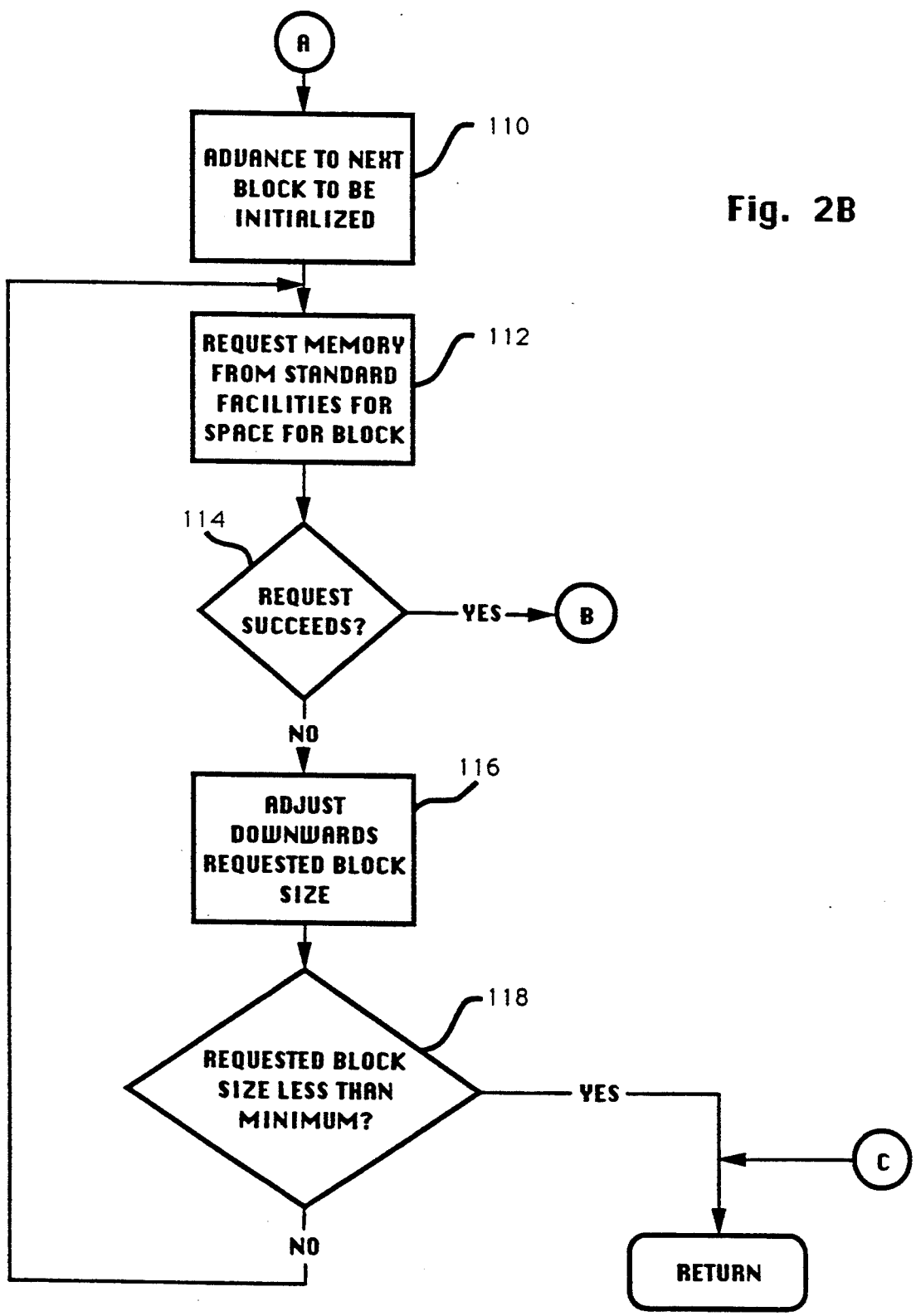

Referring to FIGS. 2A, 2B, a routine for initializing memory blocks is illustrated. It will be understood that this routine may conveniently be performed during the initialization of an application program for which efficient memory management is desired.

The routine begins with step 102 at which a "block_init" flag is set to false. Next is step 104, at which a request is made for memory space in which to house data relating to constants for the memory blocks which are to be initiated. The memory request is made using standard commands supported by the operating system, which is assumed for purposes of discussion to be the DOS operating system. Standard memory allocation and deallocation requests made to the operating system will sometimes be referred to as use of "standard facilities." The constants to be stored in the space provided by this memory request include the number of memory blocks to be defined, desired sizes of the memory blocks and maximum fragment sizes for the memory blocks, as will be discussed in more detail below.

Next follows step 106, at which it is determined whether the standard facilities have provided the memory space requested for block constants. If the request did not succeed, the routine terminates with the "block_init" flag set to false. If the request for block constant memory space succeeded, step 108 follows, at which it is determined whether all the desired blocks have been initialized. Since at this point in the discussion no blocks have yet been initialized, step 110 will now follow, at which the routine proceeds to advance to the next, which at this point is the first, memory block to be initialized. Initialization then proceeds with step 112, at which memory space is requested from the standard facilities for the block now being initialized. At step 114 it is determined whether the requested space for the block has been allocated by the standard facilities. If the request succeeds, the routine returns to step 108 and, if other blocks are to be initialized, steps 110, 112 and 114 then follow. If the request did not succeed, step 116 follows, at which the requested block size is adjusted downward by a predetermined amount. Next, it is determined whether the requested block size is less than a minimum size for that block (step 118). If not, the routine returns to step 112 at which the smaller memory allocation request is made.

It will be appreciated that the minimum size for the block as well as the amount by which the size is to be adjusted downward upon an unsuccessful allocation request (that amount sometimes to be referred to as a "size reduction decrement") are both constants that may be stored in the block constant memory space. It will also be appreciated that the routine will cycle through steps 112, 114, 116, 118 until either the requested memory space is allocated or until the requested block size is reduced below the minimum. If it is determined at step 118 during one of these cycles that the requested block size has been reduced below the minimum block size, the routine terminates with the "block_init" flag remaining set to false.

It is to be noted that the requested block size adjustment feature illustrated by steps 116 and 118 is a preferred mode of carrying out the invention, but is not essential. It will also be understood that as to a specific block, this preferred feature may optionally not be availed of, simply by setting the minimum desired size equal to the size first requested.

Returning to step 114, it will be assumed that memory space has been successfully requested from standard facilities for the first block, in which case the routine returns to step 108 and again determines whether all blocks that were to be initialized, have in fact been initialized. If not, the routine will proceed to step 110, and advance to the next block to be initialized and then again cycle through steps 112, 114, and also, if necessary steps 116 and 118. This process will continue until either the routine terminates due to failure to obtain space for a block, or it is determined at step 108 that no further blocks remain to be initialized. When that occurs, step 120 follows, at which the "block_init" flag is set to true, indicating success of the block initialization routine, and the routine then terminates.

As will be appreciated by those skilled in the art, unsuccessful termination of the block initialization routine may be followed by a number of measures, such as retrying the block initialization routine, an error message, disablement of the application program, deallocation of memory space allocated during the routine or execution of the application program.

Figure 3A:
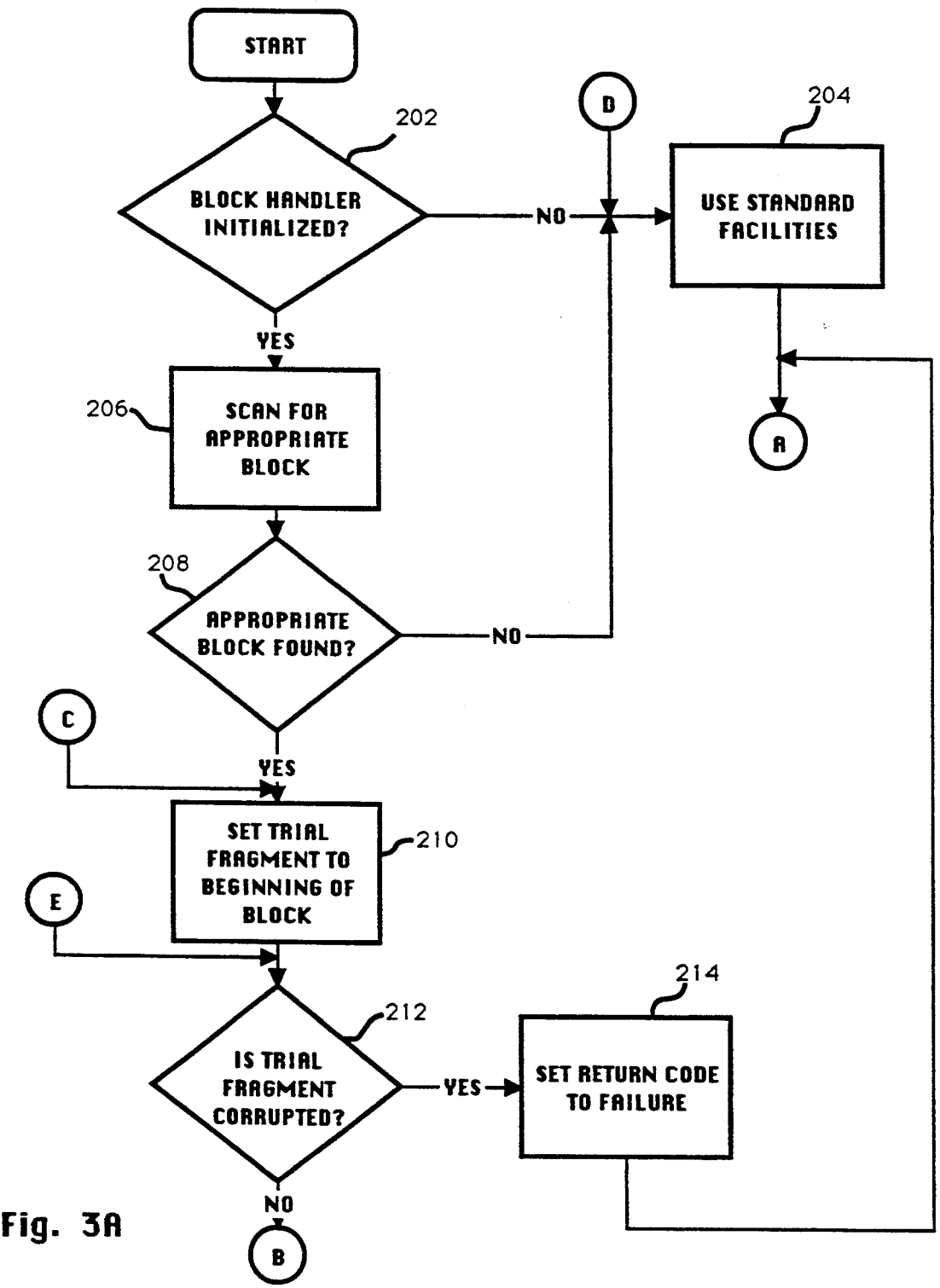
FIGS. 3A, 3B are a flow diagram that illustrates a routine for allocating a memory fragment in accordance with the invention.
Figure 3B:
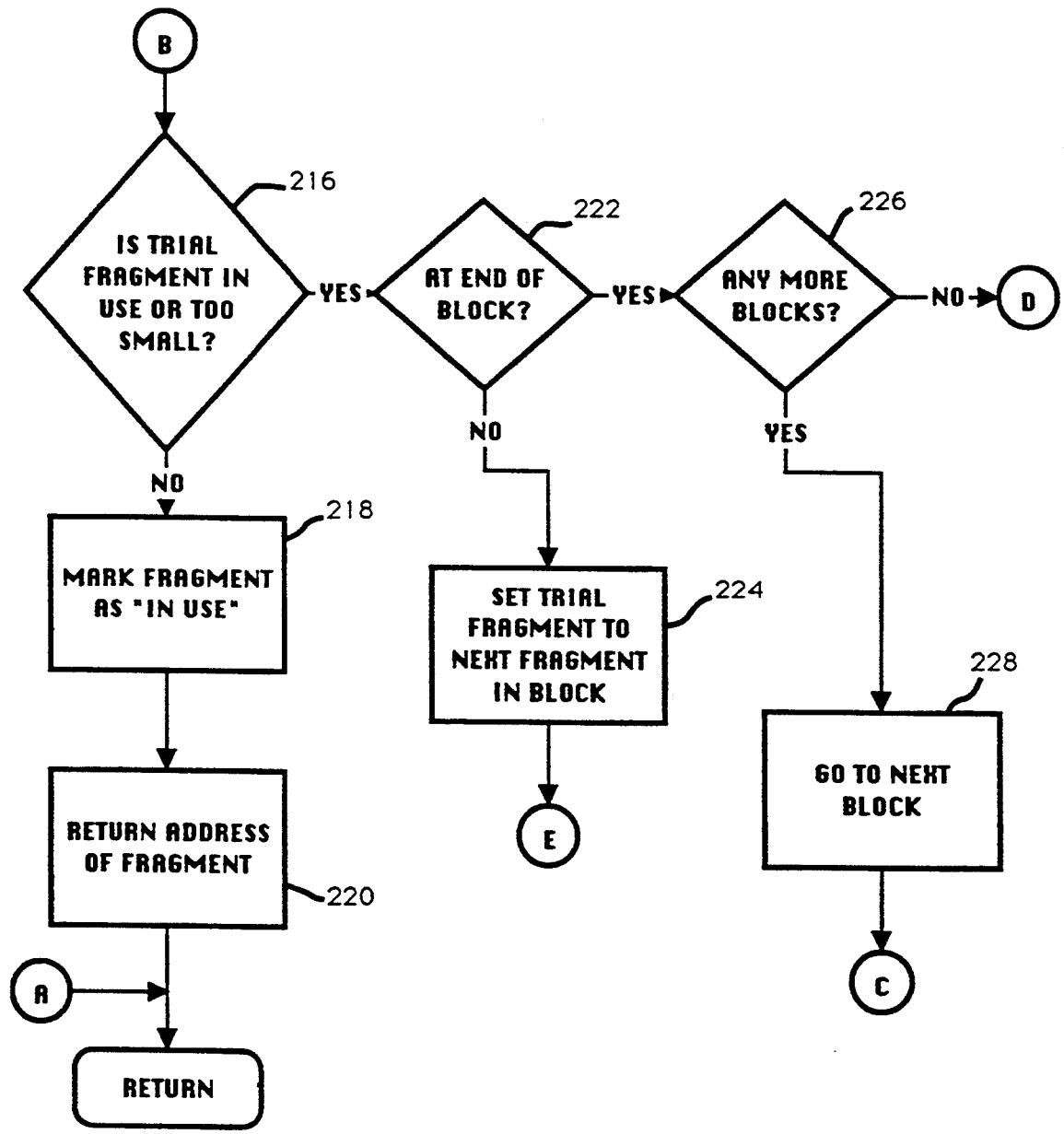

Referring to FIGS. 3A, 3B, there is illustrated a routine for allocating a memory fragment in response to a memory allocation request. The routine will be initiated upon a request by the application program for allocation of space in memory. The request will contain a specification of the size of the desired fragment.

The first step of the routine is step 202, at which it is determined whether memory blocks have been defined in accordance with the routine previously discussed. A convenient way of accomplishing this is to test whether the "block_init" flag is true. If the memory blocks described in connection with the previous routine have not been defined, the fragment allocation routine proceeds to step 204, at which the standard memory allocation facilities of the operating system are used for processing the allocation request, and the allocation routine then ends.

If at step 202 it was determined that memory blocks had been defined, the routine proceeds to step 206 at which the stored block constants are scanned for the purpose of finding an appropriate block from which the requested memory fragment may be allocated. Preferably, the search proceeds to examine first the memory block with the smallest maximum fragment size and, if necessary, proceeds to examine other memory blocks in order of increasing maximum fragment size until an appropriate block is found. A memory block will not be considered appropriate unless the maximum fragment size for the block is greater than or equal to the size of the requested memory fragment. Such a block will sometimes be referred to as an "eligible block".

At step 208 it is determined whether an appropriate memory block has been found for the requested fragment. If not, again the standard facilities are used for processing the memory allocation request (step 204). If at step 208 an appropriate block was found the routine then attempts to allocate a fragment from that block in response to the memory request. This attempt begins by considering the first memory fragment of the memory block to be the trial fragment (step 210).

At step 212, the "signature" (which will be discussed below) of the trial fragment is examined to see if it is corrupted. If corruption is found, the routine sets the return code to failure (step 214) and the routine terminates.

Step 216 follows, at which it is determined whether the trial fragment is in use nor is too small to provide the amount of space requested. If the trial fragment is neither in use nor too small, then the fragment is marked as "in use" (step 218) and the address of the fragment is returned to the application program, indicating successful allocation of the space requested (step 220) and the routine then ends. As will be appreciated by those skilled in the art, if the trial fragment is larger than the space requested, only the part of the fragment required to satisfy the request is marked as in use, and the balance becomes a new fragment that is not in use. The part of the trial fragment used for the request is preferably the "first" part, i.e. the part closest to the beginning of the memory block.

Returning to step 216, if the trial fragment was either in use or was too small, step 220 follows, at which it is determined whether the trial fragment was at the end of the memory block. If not, the next fragment in the block is considered to be the trial fragment (step 224) and the routine again proceeds to step 212 and so forth, so that the new trial fragment is tested for integrity, availability and size. In this manner, the routine proceeds through the entire memory block until either an appropriate fragment is found or the end of the block is reached.

Returning to step 222, if the trial fragment is at the end of the block, step 226 follows, at which the block constant information is again examined to determine if there are any more memory blocks. If not, the standard facilities are again availed of (step 204). If there are any more memory blocks, the routine proceeds to the next memory block (step 228), i.e. the memory block with the next higher maximum fragment size. Step 210 follows step 228, leading to a search through the next memory block for an appropriate fragment, as previously described. In this manner, the blocks are searched in order of increasing maximum fragment size, until either an appropriate fragment is found or the blocks are exhausted, in which case the standard facilities are used.

It will be observed that the blocks' maximum fragment sizes reserve the earlier block or blocks for relatively small memory allocation requests, with larger memory requests qualifying for allocation only from the later blocks. The effect is to tend to segregate the memory requests by size, with the smaller ones being allocated from the earlier blocks (those with the smaller maximum fragment sizes) and the larger requests being allocated from the later block or blocks. Where a memory request is larger than the maximum of any block, or if the blocks for which it qualifies are filled, then the standard facilities are used.

In conceptual terms, the blocks may be likened to a series of "pigeon holes" having increasingly large openings for entrance, and the memory requests may be thought of as "marbles" of various sizes. One may think of the routine as trying to insert each marble into the series of pigeon holes starting with the ones with the smallest openings and working up to the ones with the largest openings. A "marble" will be placed in a "pigeon hole" only if the marble is small enough to get through the opening and if the pigeon hole is not full.

Figure 4A:
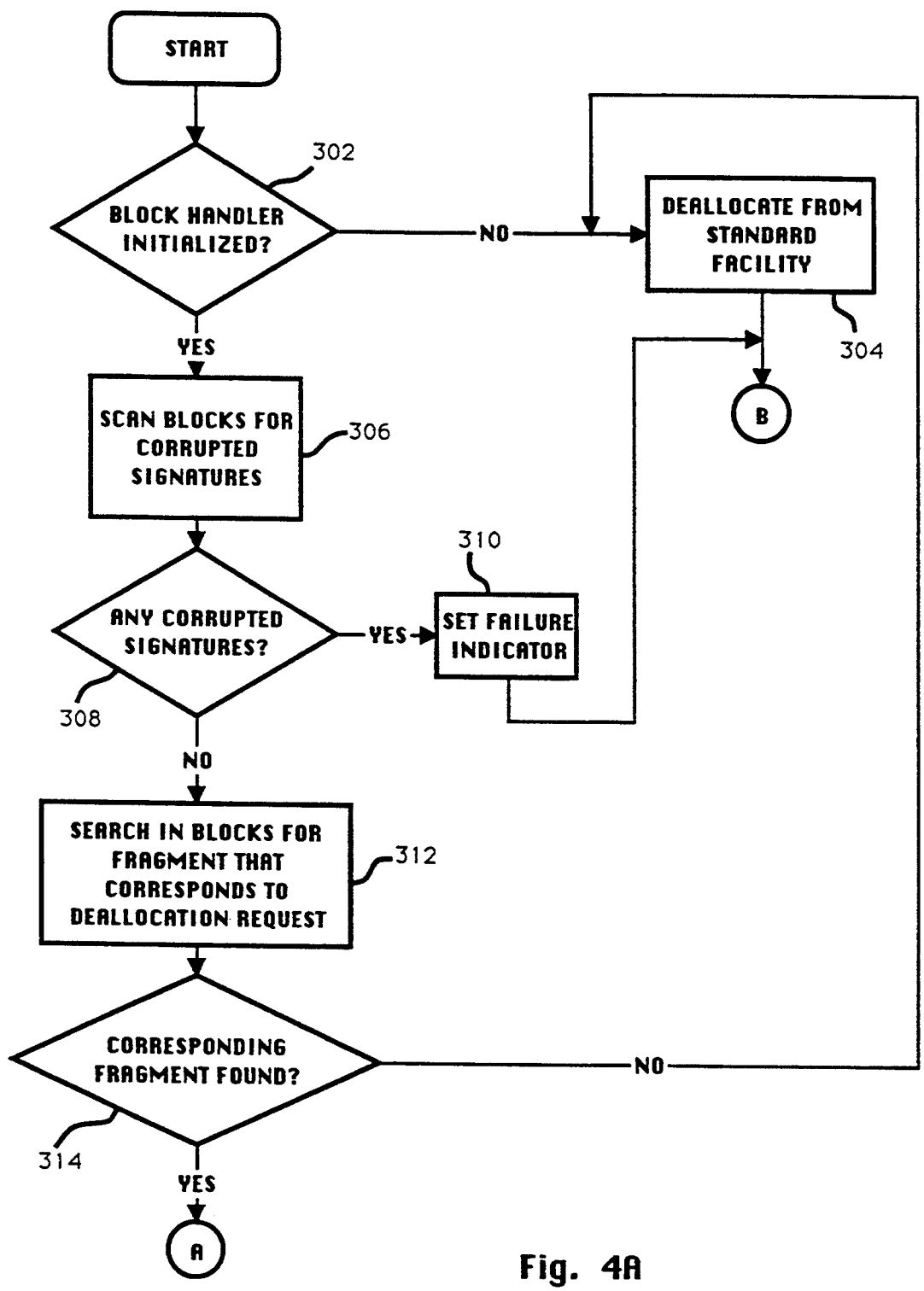
FIGS. 4A, 4B are a flow diagram that illustrates a routine for deallocating a memory fragment in accordance with the invention.
Figure 4B:
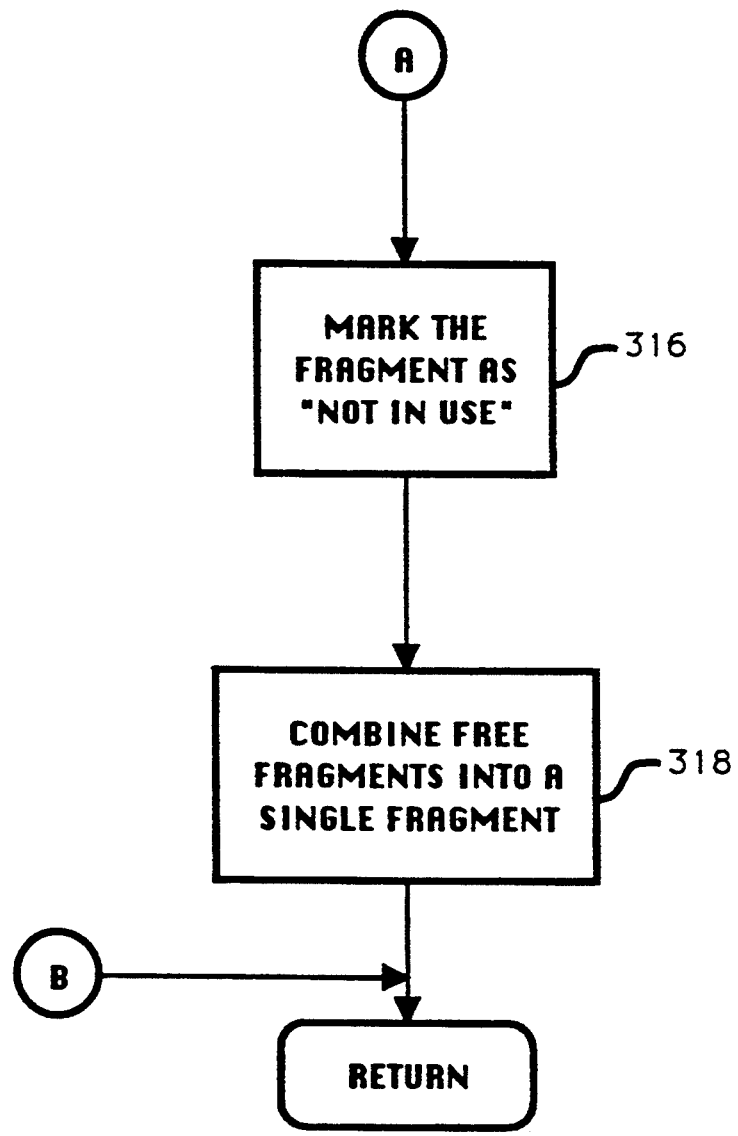

Referring to FIGS. 4A, 4B, there is illustrated a routine for deallocating memory fragments upon requests from the application program. This routine will be initiated upon a request by the applications program to deallocate or "free" a previously allocated memory fragment, presumably because the data stored therein no longer needs to be stored. First, at step 302, it is determined whether memory blocks have been defined. If not, the standard facilities are used for deallocating the memory fragment in question (step 304) and the routine terminates. If the memory blocks were defined, then step 306 follows step 302 and all of the fragment signatures in the memory blocks are scanned for corruption. Following step 306 is step 308, at which it is determined if any corrupted signatures were found. If so, a failure indicator is set (step 310) and the routine terminates. If at step 308, no corrupted signatures were found, step 312 follows, at which it is attempted to find in the memory blocks, the fragment that corresponds to the deallocation request. At step 314 it is determined whether the corresponding fragment is found. If not, again the standard facilities are used to service the deallocation request (step 304) and the routine terminates. If the corresponding fragment is found, it is marked as "not in use" (step 316). Step 318 follows, wherein the just deallocated fragment is combined with the preceding one, if the preceding one is not in use. Similarly, if the fragment following the just deallocated fragment is not in use, the two fragments are combined. Also, of course, if all three fragments are not in use, all three are combined.

The memory management method described above has been implemented in a DOS environment and has been found to improve the efficiency of memory utilization and to decrease memory fragmentation by segregating memory fragments by size.

Another mode of carrying out the invention is illustrated by reference to FIGS. 5A, 5B, 5C. In this mode, one or more memory blocks are defined in accordance with the procedure described in connection with FIGS. 2A, 2B. However, in addition to the block constants previously described, there is established for at least one of the memory blocks a "dividing point" fragment size (sometimes hereinafter "dividing point"). The dividing point is selected to be less than the maximum fragment size for the block, and may be greater than the maximum size of the immediately preceding block.

Figure 5A:
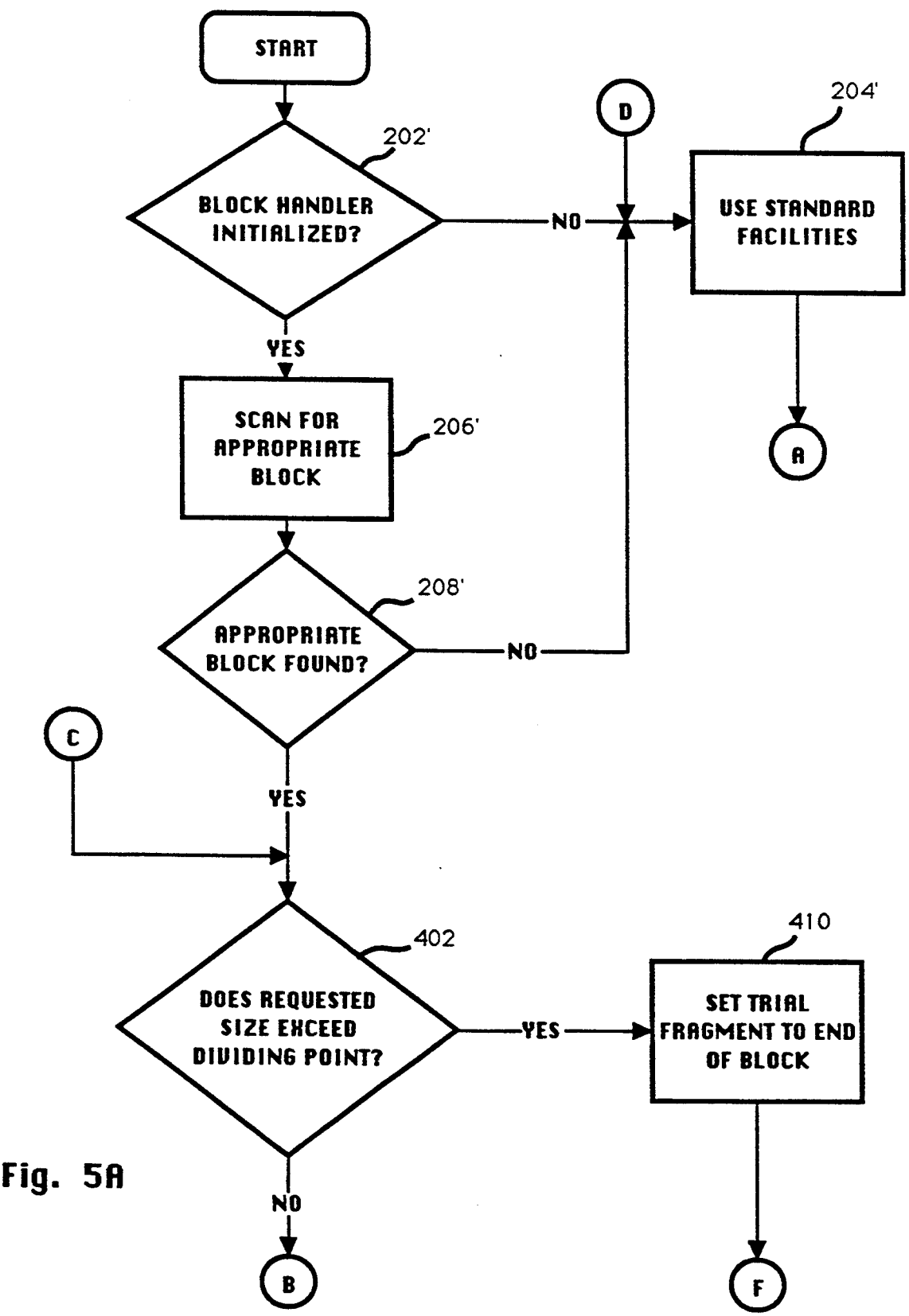
FIGS. 5A, 5B, 5C are a flow diagram that illustrates an alternative routine for allocating a memory fragment in accordance with another aspect of the invention.
Figure 5B:
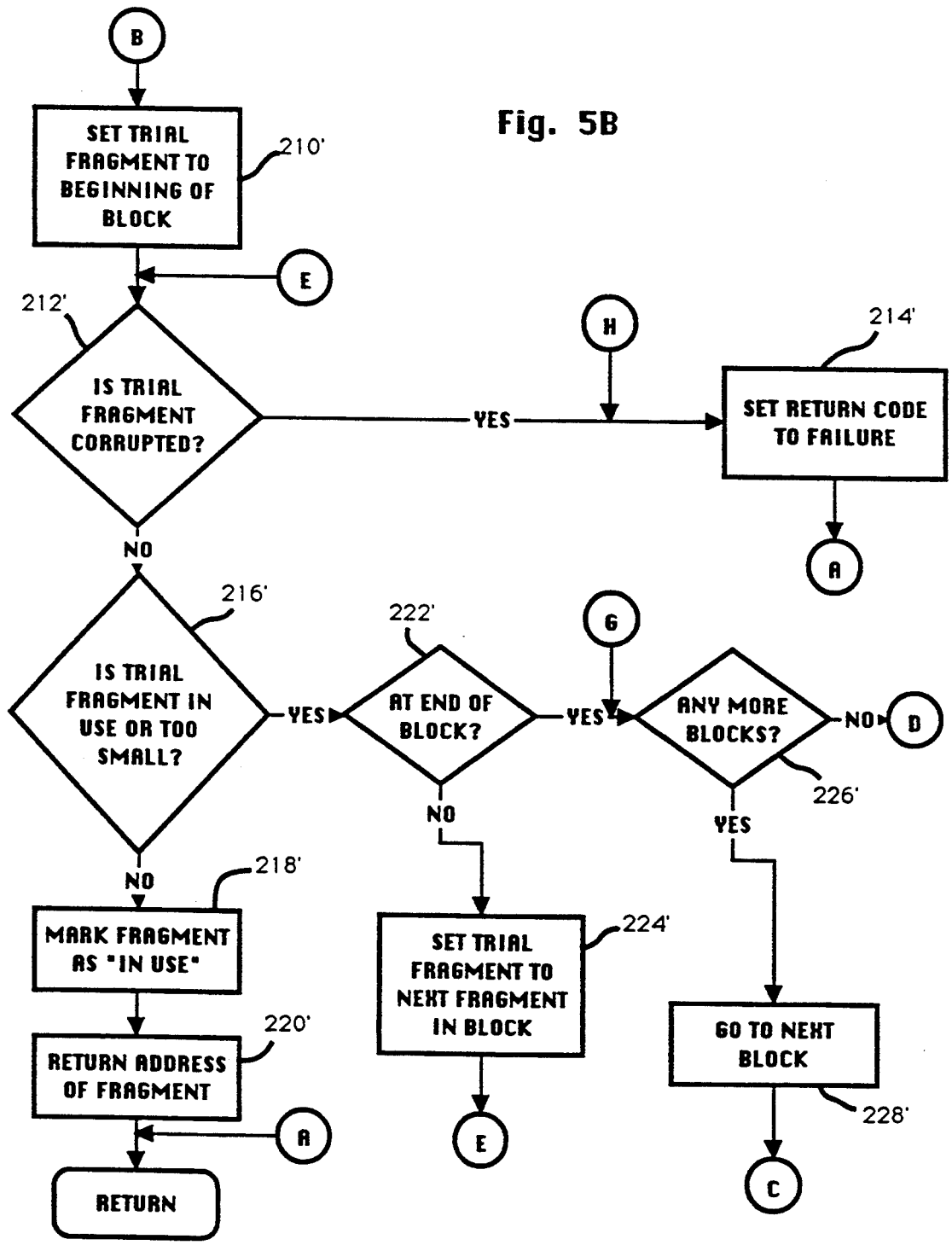
Figure 5C:
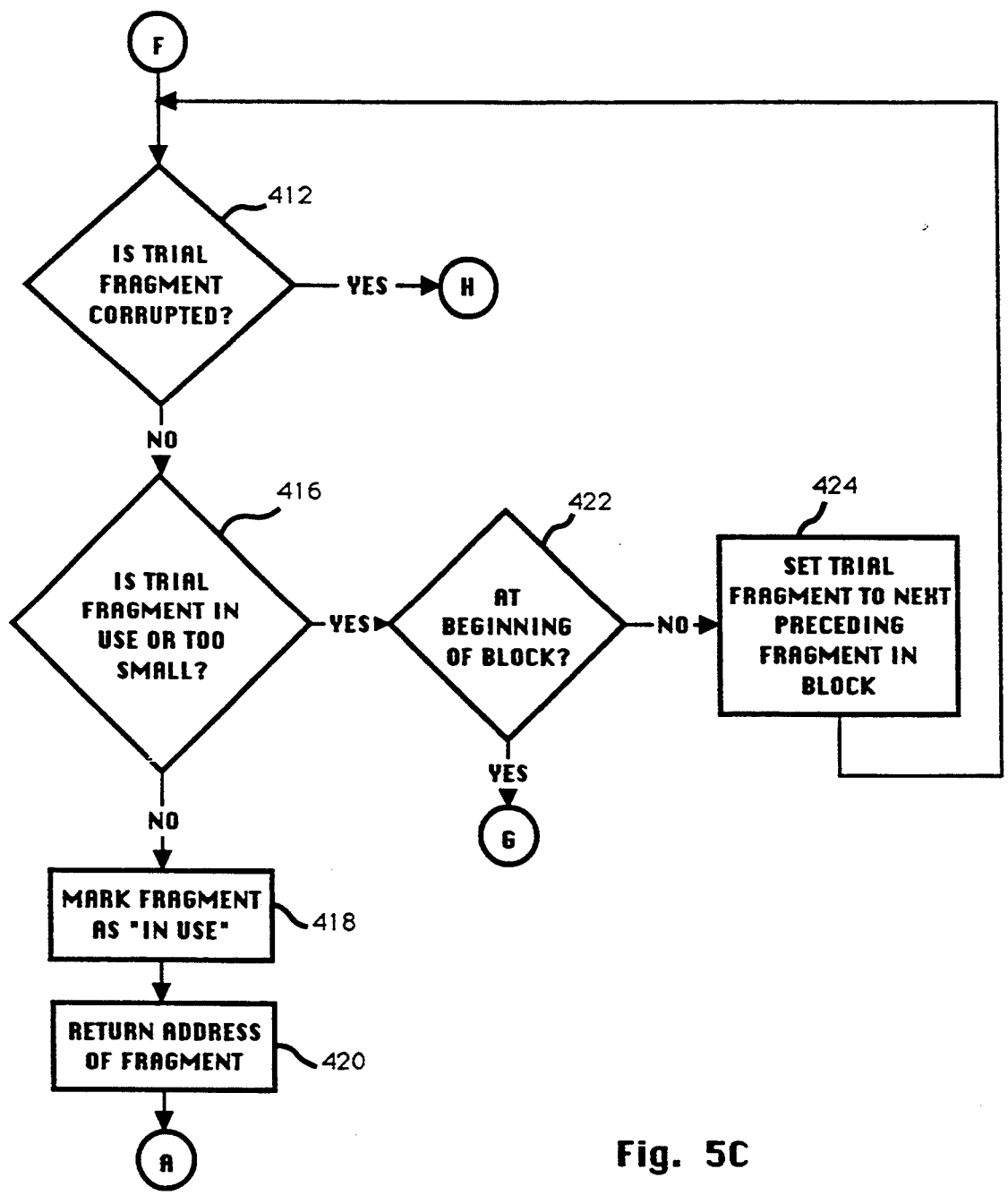

Referring now to FIGS. 5A, 5B, 5C it will be noted that steps 202', 204', 206' and 208' are the same as steps 202, 204, 206, 208 of FIG. 3A and so need not again be described.

If at step 208' it is determined that there is a memory block having a maximum fragment size equal to or greater than the requested fragment size, step 402 follows, at which it is determined whether the requested fragment size exceeds the dividing point that has been established for that memory block. If no dividing point has been established the requested fragment size will always be considered not to exceed the dividing point. The fact that no dividing point has been established may be indicated by setting the dividing point equal to the maximum fragment size or by appropriate setting of a flag or by other means.

In any event, assuming that at step 402 the requested fragment was determined not to exceed the dividing point, step 210' then follows. As steps 210', 212', 214', 216', 218', 220', 222', 224', 226', 228' of FIG. 5B are the same as steps 210, 212, 214, 216, 218, 220, 222, 224, 226, 228 of FIGS. 3A, 3B, no additional explanation is required, except to note that in the method of FIGS. 5A, 5B, 5C step 402 will follow step 228'.

Returning again to step 402, if the requested fragment was found to exceed the memory block's dividing point, step 410 follows, at which the trial fragment is set to be the last fragment in the memory block, i.e. the fragment at the end of the block.

Step 412 (FIG. 5C) follows step 410. In step 412, as in step 212', it is determined whether the trial fragment is corrupted, and if so step 214' follows in which the return code is set to failure and the routine then terminates. If at step 412 the trial fragment is not found to be corrupted, step 416 follows, at which it is determined whether the trial fragment is in use or is too small to accommodate the requested memory fragment. If at step 416 it is determined that the trial fragment is neither in use nor too small, steps 418 and 420 follow in which, respectively, the trial fragment is marked as "in use" and the address of the fragment is returned, followed by termination of the routine. As discussed with respect to steps 218, 220 of FIGS. 3A, 3B and as also applies to steps 218' and 220', if the trial fragment successfully tested at steps 412 and 416 is larger than is required to accommodate the requested fragment, the trial fragment will be subdivided, however, unlike steps 218, 220 or 218', 220', at steps 418 and 420 the portion of the trial fragment used to accommodate the requested fragment will preferably be the last portion of the trial fragment so that the balance of the trial fragment not allocated to the memory request will be the first portion of the trial fragment in terms of addressable locations. Thus the overall effect of steps 402, 410, 412, 416, 418, 420 will be to load the requested fragment as close as possible to the end of the memory block when the requested fragment size exceeds the dividing point. Similarly, when the requested fragment size does not exceed the dividing point, the requested fragment is loaded as close as possible to the beginning of the block.

Returning to step 416, if the trial fragment is either in use or too small, step 422 follows at which it is determined whether the trial fragment just tested was at the beginning of the memory block. If not, the next preceding fragment is set to be the trial fragment (step 424) and step 412 and so forth then follow. If at step 422 it was found that the trial fragment is at the beginning of the block, there follows step 226' (determination whether there are more memory blocks) and so forth.

The overall effect of the method of FIGS. 5A, 5B, 5C is to provide two layers of segregation by size in the allocation of requested memory fragments. First, like the method illustrated in FIGS. 3A, 3B, smaller fragments tend to be allocated from the earlier memory blocks, while larger fragments are restricted to later memory blocks. Secondly, within those memory blocks for which a dividing point is established, fragments that are smaller than the dividing point tend to be allocated toward the beginning of the memory block, while requested fragments that exceed the dividing point tend to be allocated toward the end of the memory block.

It should be recognized that the intra-block segregation process described above could also be implemented by allocating fragments that exceed the dividing point toward the beginning of the block and fragments that do not exceed the dividing point toward the end of the block. Thus, a more general description of intra-block segregation would simply note that the block has a first end and a second end, and that fragments not exceeding the dividing point are allocated as close as possible to the first end and fragments exceeding the dividing point are allocated as close as possible to the second end. This description encompasses a first case in which the beginning of the block is considered the first end and the end of the block is considered the second end, as well as a second case in which the beginning is considered the second end and the end of the block is considered the first end.

The deallocation routine described by reference to FIGS. 4A, 4B applies as well to a method including the allocation routine of FIGS. 5A, 5B, 5C as to a method including the allocation routine of FIGS. 3A, 3B.

Figure 6A:
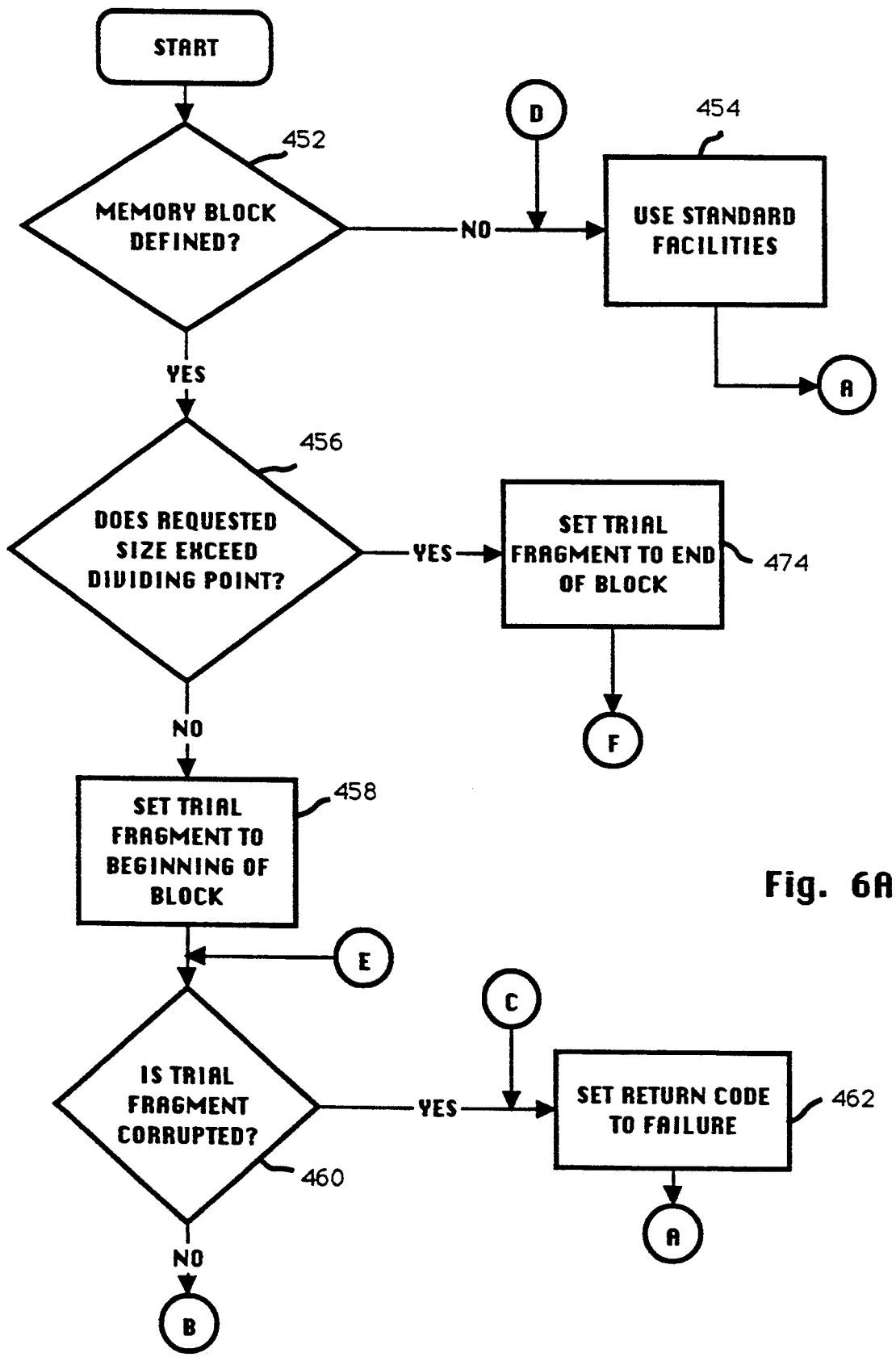
FIGS. 6A, 6B, 6C are a flow diagram that illustrates a futher alternative routine for allocating a memory fragment in accordance with a further aspect of the invention.
Figure 6B:
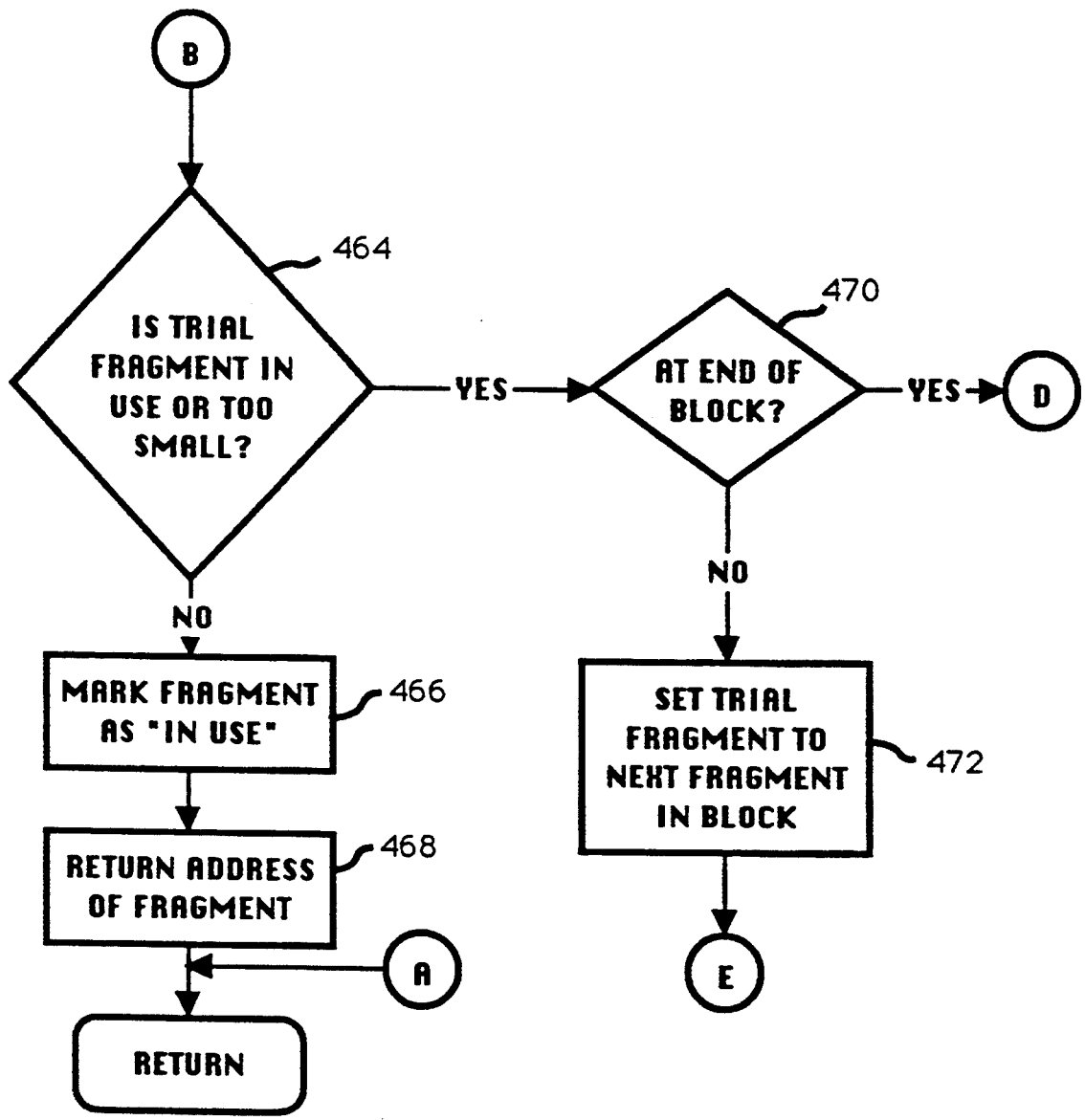
Figure 6C:
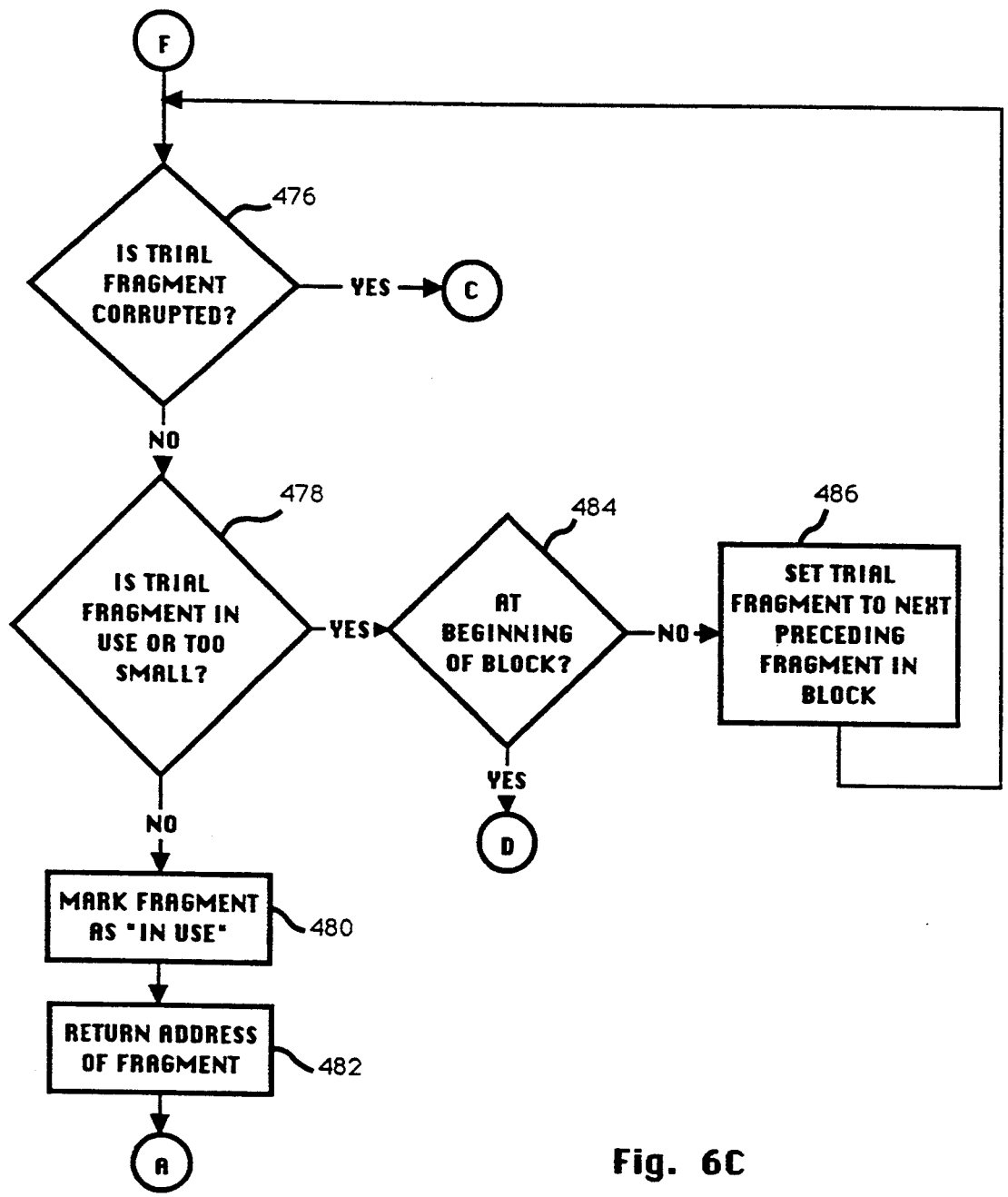

It should be noted that according to another aspect of the invention, fragments may be segregated by size within a single memory block without segregation of fragments by size among memory blocks. FIGS. 6A, 6B, 6C illustrate a mode of carrying out the invention in accordance with this aspect. It is to be assumed that a memory block has been defined in accordance with the routine of FIGS. 2A, 2B, except that for that memory block, there is no maximum fragment size but there is a dividing point for fragment sizes.

The routine of FIGS. 6A, 6B, 6C commences upon receipt of a request for allocation of a memory fragment. First, at step 452 it is determined whether a memory block has been defined. If not, standard facilities are used to honor the allocation request (step 454), as has been previously described.

If at step 452 a memory block was found to have been defined, step 456 follows, at which it is determined whether the size of the requested memory fragment exceeds the dividing point established for the memory block. As in the routine of FIGS. 5A, 5B, 5C, if the requested fragment does not exceed the dividing point, it will be allocated as close as possible to the beginning of the memory block, while if the size of the fragment exceeds the dividing point, it will be allocated as close to the end of the memory block as possible. As the remaining steps of the routine of FIGS. 6A, 6B, 6C mirror those of FIGS. 5A, 5B, 5C only a brief explanation of the balance of FIGS. 6A, 6B, 6C is required. Thus if the requested fragment size does not exceed the dividing point, step 456 is followed by step 458 in which the trial fragment is set to the beginning of the memory block. The trial fragment is then tested for corruption (step 460). If corruption is found, the return code is set to failure (step 462) and the routine ends. If no corruption is found at step 460 and if the trial fragment is not in use or too small (step 464), the fragment is marked as "in use", the address of the fragment is returned and the routine ends (steps 466, 468). As previously discussed, if the trial fragment was larger than required for the requested memory allocation, the fragment is divided, with the initial part of the fragment allocated to the requested fragment and the balance being divided off to form a new, unallocated fragment.

If at step 464 the trial fragment was either in use or too small, it is next determined whether the end of the block is reached (step 470), and if so, standard facilities are used to honor the allocation request (step 454). If at step 470 it was found that the end of the block had not been reached, the next fragment is taken to be the trial fragment (step 472) and the routine then returns to step 460.

Returning now to step 456, if at that step the size of the requested fragment is found to exceed the dividing point, the last fragment in the memory block is taken to be the trial fragment (step 474). As before, the trial fragment is now tested for corruption (step 476) and if corruption is found the return code is set to failure (step 462) and the routine ends. If at step 476 no corruption was found, it is then determined whether the trial fragment is in use or too small (step 478), and if not, the trial fragment is marked as in use, the address of the trial fragment is returned (steps 480, 482) and the routine ends. As discussed in a similar context with regard to FIGS. 5A, 5B, 5C, steps 480 and 482 differ from steps 466, 468 in that during steps 480, 482, if the trial fragment is larger than is required to accommodate the memory allocation request, the necessary space is allocated from the end of the trial fragment and the unused beginning portion of the trial fragment is separated as a new, unused fragment. Thus the branch of the routine starting at step 458 results in allocation of the requested fragment as close as possible to the beginning of the memory block, while the branch of the routine starting with step 474 results in allocation as close as possible to the end of the memory block. Completing the discussion of FIGS. 6A, 6B, 6C, if at step 478 the trial fragment is found to be in use or too small, it is determined whether the trial fragment is at the beginning of the block (step 484), and if so the standard facilities are used (step 454). Otherwise, the fragment next preceding the trial fragment is now considered to be the trial fragment (step 486) and the routine then returns to step 476.

Figure 7:
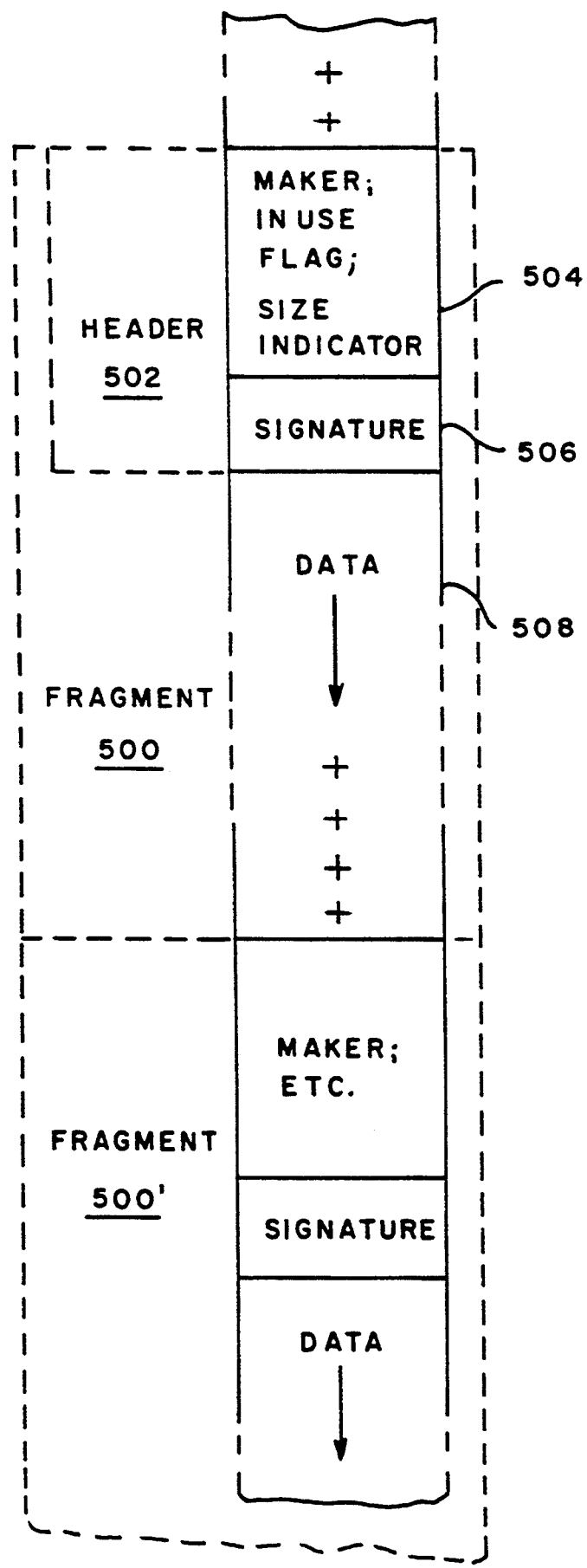
FIG. 7 is a schematic illustration of memory fragments arranged in accordance with the invention.

The memory fragment signature, previously referred to, will now be discussed. As seen in FIG. 7, reference numerals 500, 500' refer to memory fragments (only part of fragment 500' is shown). Fragment 500 comprises header 502, which in turn comprises heading section 504 and signature 506 which immediately follows heading section 504. Immediately following header 502 is data section 508, which is shown in abbreviated form. Heading section 504 comprises a number of bytes including a marker, which is an arbitrary character or sequence of characters that indicates the beginning of a memory fragment; an in use flag for indicating whether the fragment is in use or not in use; and one or more bytes to indicate the size of the fragment. Signature 506 comprises one or more arbitrary characters which may be used as a test to determine whether memory corruption has occurred. Thus when a marker character is found, it is known that the character or characters comprising the signature should be found a known number of memory locations following the marker. If the requisite character or characters are not found at that location, it can be inferred that corruption of the memory space has occurred.

A memory management method in accordance with the invention has been implemented in connection with the Star 200 parcel processing system marketed by Pitney Bowes Inc., Stamford, Conn., utilizing the NCR P.C. model 810 operating under the NCR DOS 3.3 operating system. Both the P.C. and the operating system were marketed by NCR Corporation, Dayton, Ohio.

In the implementation just mentioned, three memory blocks were defined. For the first memory block, the size of the block was established as 12,160 bytes and a maximum fragment size for that block was established as 1,024 bytes. For the second memory block, the size was 65,408 bytes and the maximum fragment size was 6,144 bytes. For the third memory block, the size was 53,248 bytes and the maximum fragment size was 16,384 bytes. Allocation requests exceeding 16,384 bytes were handled by the standard DOS memory allocation facilities, so that the balance of the memory can be considered as comprising as a fourth memory block, without a maximum fragment size. No fragment size dividing point was established for the memory blocks, nor was there any standard amount by which a memory block was to be reduced in size. The memory block characteristics described above were arrived at after a modest amount of experimentation, bearing in mind the operating characteristics of the parcel processing system application program. It is within the capability of those skilled in the art to readily arrive at appropriate characteristics, including number, size, maximum fragment size, dividing point, and standard reduction amount, for the memory blocks to be used with a particular application program. The number and size of allocation requests made by the applications program, the amount of memory space available, the frequency of requests and the duration of a fragment in memory before deallocation are all factors that influence the desirable characteristics of the memory blocks. It was found in the above mentioned parcel processing system, that implementation of the aforesaid memory management method did not cause any noticeable deterioration in the performance of the system, while permitting more transactions to be stored in the memory than had previously been possible.

It will be appreciated that the subject invention may be carried out in a large number of ways. For example, one could define only a single memory block with a maximum fragment size, allocating via the standard facilities all requested fragments that exceed that size. The standard facilities would also be used once the block becomes full. The example of the previous paragraph can be modified by establishing a dividing point, less than the maximum fragment size, for the memory block. Alternatively, or in addition, a second block with a dividing point may be defined, including some or all of the rest of the memory space.

As another alternative, and as discussed with respect to FIGS. 6A, 6B, 6C, a single block, with a dividing point but no maximum fragment size, can be defined. That block could be either all or part of the memory space.

Still another alternative would be to define two memory blocks, each with a dividing point but no maximum fragment size, with the second block to be used when the first is full. The two blocks may together make up all of the memory space.

As will have become apparent, the number of blocks to be defined is limited only by practical considerations such as the total size of the memory space. Further, there are many possible variations as to how many of the blocks have a maximum fragment size, how many have a dividing point, and how many have both. Thus, it is to be understood that the modes described above are not to be considered as limiting and limitations on the subject invention are to be found only in the attached claims.

What is claimed is:

1. A method of operation of a data processing device having a memory space to manage allocation of said memory space, operation of said data processing device comprising the steps of:
    a) storing first data, said first data specifying first and second ends for a first memory block;
    b) storing second data, said second data specifying a maximum fragment size which can be allocated from said first memory block;
    c) responding to a memory request generated by an application being executed by said data processing device to allocate a fragment to said application, said memory request specifying a requested fragment size, said responding step including the further steps of:
    c1) comparing said requested fragment size to said maximum fragment size; and
    c2) allocating an unallocated fragment to said application from said block only if said requested fragment size is less than said maximum fragment size, and otherwise;
    c3) responding to said memory request in a predetermined manner without making said requested allocation from said block;
    c4) allocating to said application another unallocated fragment of said memory space which has no addressed portions in common with said first memory block;
    c5) storing third data, said third data specifying first and second ends for a second memory block;
    c6) storing fourth data, said fourth data specifying a maximum fragment size which can be allocated from said second memory block, wherein said maximum fragment size which can be allocated from said second memory block is greater than said maximum fragment size which can be allocated from said first memory block;
    c7) if said requested fragment size is greater than said memory fragment size which can be allocated from said first memory block, then responding to said memory request by allocating an unallocated fragment from said second memory block to said application only if said requested fragment size is less than said maximum fragment size which can be allocated from said second memory block; and otherwise
    c8) responding to said memory request in a predetermined manner without making said requested allocation from said first memory block and without making said requested allocation from said second memory block;
    c9) allocating to said application said another unallocated fragment of said memory space which has no addressed portions in common with said first memory block and which further has no addressed portions in common with said second memory block.

2. A method of operation of a data processing device having a memory space to manage allocation of said memory space, operation of said data processing device comprising the steps of:
    a) storing first data, said first data specifying first and second ends for a first memory block;
    b) storing second data, said second data specifying a maximum fragment size which can be allocated from said first memory block;
    c) responding to a memory request generated by an application being executed by said data processing device to allocate a fragment to said application, said memory request specifying a requested fragment size, said responding step including the further steps of:
    c1) comparing said requested fragment size to said maximum fragment size; and
    c2) allocating an unallocated fragment to said application from said block only if said requested fragment size is less than said maximum fragment size, and otherwise;
    c3) responding to said memory request in a predetermined manner without making said requested allocation from said block;
    c4) storing additional data, said additional data specifying a dividing point fragment size, said dividing point fragment size being less than said maximum fragment size which can be allocated from said first memory block; and
    wherein said allocating step (b) further comprises the steps of:
    b1) allocating said fragment to said application as closely as possible to said first end of said first memory block if requested fragment size is not greater than said dividing point fragment size; and
    b2) allocating said fragment to said application as closely as possible to said second end if said requested fragment size is greater than dividing point fragment size.

3. A method of operation of a data processing device having a memory space to manage allocation of said memory space, operation of said data processing device comprising the steps of:
    a) storing first data, said first data specifying first and second ends for a first memory block;
    b) storing second data, said second data specifying a maximum fragment size which can be allocated from said first memory block;
    c) responding to a memory request generated by an application being executed by said data processing device to allocate a fragment to said application, said memory request specifying a requested fragment size, said responding step including the further steps of:

c1) comparing said requested fragment size to said maximum fragment size; and c2) allocating an unallocated fragment to said application from said block only if said requested fragment size is less than said maximum fragment size, and otherwise;

c3) responding to said memory request in a predetermined manner without making said requested allocation from said block;

d) executing an initialization routine;

e) receiving a request from said initialization routine to allocate a segment of said memory space as said first memory block and determine said first data, said request from said initialization routine specifying a desired first memory block size, a minimum first memory block size, and a size reduction decrement;

f) using standard facilities of said data processing device to make said requested allocation of said memory space as said first memory block, said using step further comprising the steps of:

f1) determining if an unallocated segment of said memory space can be allocated as said first memory block, and if so specifying storing said first data; otherwise f2) determining if said desired first memory block size is greater than said minimum first memory block size, and if not, exiting to a predetermined error routine; and f3) if said desired first memory block size is greater than said minimum first memory block size reducing said desired first memory block size by said size reduction decrement and returning to step (f1).

* * * * *